United States Patent [19]
Hara et al.

[11] Patent Number: 5,336,463
[45] Date of Patent: Aug. 9, 1994

[54] MOLD FOR PRESS MOLDING AND PROCESS FOR PRESS MOLDING OF THERMOPLASTIC RESIN USING THE SAME

[75] Inventors: Takahisa Hara, Kawanishi; Masahito Matsumoto, Osaka; Nobuhiro Usui, Osaka; Shigeyoshi Matubara, Osaka, all of Japan

[73] Assignee: Sumitomo Chemical Company, Limited, Osaka, Japan

[21] Appl. No.: 955,756

[22] Filed: Dec. 24, 1992

[30] Foreign Application Priority Data

Apr. 24, 1991 [JP] Japan ................... 3-094265

[51] Int. Cl.$^5$ .................. B29C 45/28; B29C 45/38
[52] U.S. Cl. ................... 264/328.7; 264/328.8; 264/328.11; 425/562; 425/574
[58] Field of Search ............ 264/328.7, 328.11, 328.15, 264/328.8; 425/562, 564, 568, 569, 574

[56] References Cited

FOREIGN PATENT DOCUMENTS

| | | |
|---|---|---|
| 333198 | 9/1989 | European Pat. Off. . |
| 0397883 | 11/1990 | European Pat. Off. . |
| 61-22917 | 1/1986 | Japan . |
| 1235613 | 9/1989 | Japan . |
| 2138737 | 10/1984 | United Kingdom . |

*Primary Examiner*—Jill L. Heitbrink
*Attorney, Agent, or Firm*—Birch, Stewart, Kolasch & Birch

[57] ABSTRACT

Press molding is carried out by using a mold having a nozzle which opens and closes a molten resin passage provided in an upper half or a lower half and which is located 10-100 mm below a mold cavity side surface of the half, by supplying a thermoplastic resin to a cavity between the respective upper half and the lower half which is not closed and by clamping the mold. Thus, a molded article having a good appearance can be produced even when a molding cycle is short.

10 Claims, 1 Drawing Sheet

MOLD FOR PRESS MOLDING AND PROCESS FOR PRESS MOLDING OF THERMOPLASTIC RESIN USING THE SAME

BACKGROUND OF THE INVENTION

1. Field of the Invention

The present invention relates to a metal mold suitable for the press molding of a thermoplastic resin and a process for press molding using the mold.

2. Description of Related Art

A great deal of plastic moldings are widely used in any field such an automobile and a domestic electrical equipment due to their economy, ease of shaping and light weight;

A press molding process or an injection molding process is known as a process for the production of such moldings. The press molding process can produce moldings having less molding strain since they can be molded under a lower pressure than that of the injection molding process so that moldings with less warpage and deformation can be advantageously produced at a low cost using a molding machine having a small clamping force. In addition, the press molding process is also advantageous in that when various materials are laminated on surfaces of the moldings, the skin materials are unlikely to be damaged since the molding pressure is smaller.

For example, Japanese Patent Kokai Publication No. 22917/1986 (corresponding to U.S. patent application Ser. No. 7/793,329) discloses such a press molding process of a thermoplastic resin in which the thermoplastic resin in molten condition is supplied through a molten resin passage which is provided in a metal mold body and the resin is pressed. However, the mold used in the process has a nozzle, as described in the Publication, such that a tip portion of the nozzle through which the resin goes into an inside of the mold is flush with a cavity side surface of the mold (see FIG. 1). Thus, when molding is repeated using such a mold, a temperature of a portion of the mold near the nozzle is gradually increased by the supplied molten resin. Especially, when the molding is repeated in a short time (namely, a molding cycle is short), such a portion of the mold is insufficiently cooled so that a molded article has a bulge in its portion which has been adjacent to such an insufficiently cooled portion and/or the molded article has a gloss, on such a portion, which is different from that of other portion of the molded article. It is, therefore, difficult to produce an article having a good appearance.

In addition, when a multi-layer molded article comprising a skin material laminated thereon is formed, the article has a bulge on a portion thereof which was adjacent to or near the nozzle, so that the molded article having a good appearance cannot be produced by a series of molding.

When a temperature of the nozzle portion of the mold is set to a relatively lower temperature so as to prevent the temperature increase of the mold surface portion near the nozzle, not only but difficult for the molten resin to enter the cavity of the mold, but also that a temperature of the molten resin is reduced so that it is likely to produce a defective article such as a molded article having a ring-shaped mark on a portion thereof which corresponds to an inlet through which the molten resin is supplied into the cavity of the mold.

SUMMARY OF THE INVENTION

The present inventors have made extensive studies so as to produce a press molded article of a thermoplastic resin having a good appearance even when the molding cycle is short by overcoming the above problems, and found that such an object is achieved by providing the nozzle of the molten resin passage in a portion of the mold which is separated from the cavity side surface of the mold by a specified distance.

Thus, the present invention provides a mold for the press molding of a thermoplastic resin characterized in that an upper half or a lower half has a molten resin passage and a tip portion of a nozzle which opens or closes the molten resin passage is located at a portion of the mold which is 10–100 mm away from a cavity side surface of the respective half. The present invention also provides a process for the press molding of a thermoplastic resin characterized in that using the above present mold is used and the thermoplastic resin in molten condition is supplied, through the molten resin passage and the nozzle, to a cavity between the upper half and the lower half which is not closed, and then the mold is clamped after the molten resin passage is closed to have a molded article.

DETAILED DESCRIPTION OF THE INVENTION

The present invention will be, hereinafter, explained on the basis of the accompanying drawings.

Figure 1:
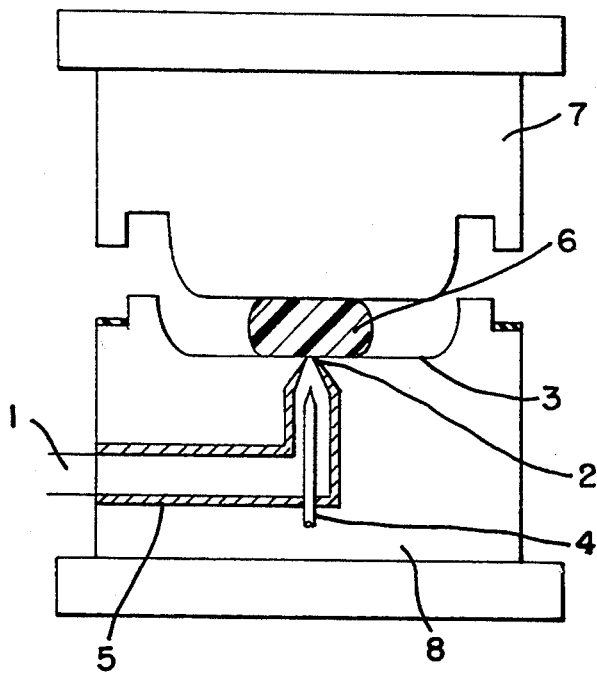
FIG. 1 shows a longitudinal sectional view of a mold for the press molding of prior art.
Figure 2:
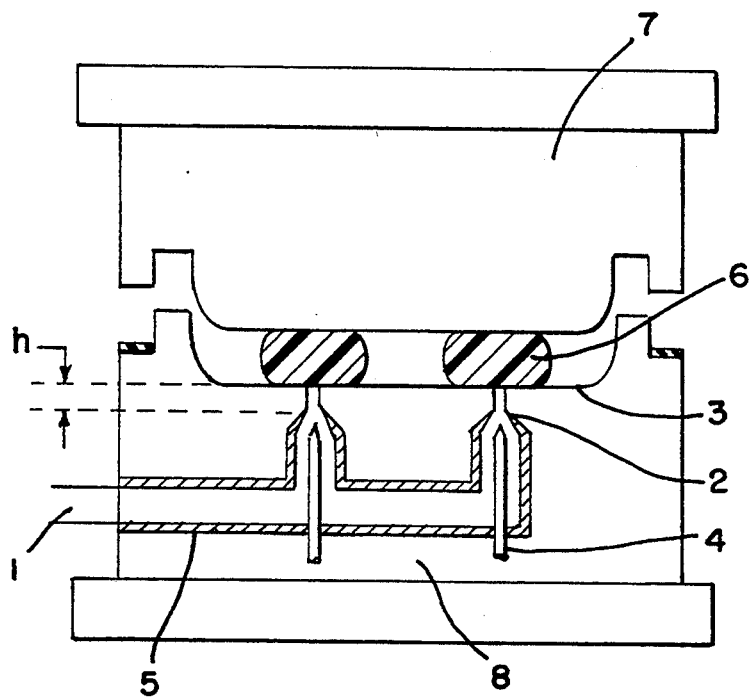
FIG. 2 shows a longitudinal sectional view of a mold for the press molding of the present invention.

FIG. 2 exemplifies the mold of the present invention, in which the molten resin passage (1) is provided in the lower half, and the tip portion of the nozzle (2) is separated from the mold cavity side surface (3) of the mold by 10–100 mm below (which is indicated by a distance "h" in FIG. 2). In FIGS. 1 and 2, the same members have the same reference numerals.

A single nozzle (2) is not necessarily provided for a single passage, and two or more nozzles may be provided for a single passage as desired.

The nozzle (2) has an opening-closing function for the resin passage and pins (4) are provided in lower portions of the nozzles for the opening and closing operation.

The pin. (4) is raised or lowered according to supply or stop of the molten resin by means of a hydraulic apparatus (not shown).

The pin (4) is lowered when the resin is supplied so that a space is defined between the nozzle (2) and the pin (4) whereby the molten resin passage is in a open position. When a desired amount of the resin is supplied, the pin (4) is raised and the tip portion thereof closes an opening of the nozzle (2) so that the molten resin passage is closed.

Therefore, the tip portion of the pin (4) should have a shape and a design such that the pin (4) completely closes the opening of the nozzle (2) when the pin (4) is raised and contacts the opening of the nozzle (2). For example, the tip portion may be in a semi-spherical form which inscribes or circumscribes the opening of the nozzle, or in a cylindrical form of which the diameter is larger than that of the opening of the nozzle. The shape and the design may be any suitable ones provided that they achieve their functions.

It is critical that a position of the tip portion of the nozzle (2) is located 10-100 mm and preferably 20-80 mm (shown as a distance "h" in FIG. 2) below the cavity side surface (3) of the mold. A portion of the resin passage between the nozzle (2) and the cavity side surface may have the same diameter as that of the nozzle, and preferably such a portion of the molten resin passage is so tapered that a diameter of an opening on the cavity side surface is slightly larger than the diameter of the nozzle.

When the distance between the tip portion of the nozzle and the cavity side surface is smaller than 10 mm, it is difficult to uniformly maintain temperature on the mold surface and a molded article having a good appearance cannot be produced when a molding cycle is short. When the distance between the tip portion of the nozzle and the cavity side surface exceeds 100 mm, a thickness of the mold is increased and a weight of the mold is also increased.

As the nozzle opening and closing mechanism, in place of the mechanism in which the pin (4) for the opening and closing function is provided in the lower portion of the nozzle as described above, various mechanisms may be employed. For example, a spring which expands depending on a supply pressure of the resin is provided in the nozzle so that the spring shrinks and the nozzle is in the open position when the resin supplying pressure is applied to the resin in the nozzle by the resin supply, and the spring expands and the nozzle opening is closed when the resin supply is stopped and the resin supplying pressure is not acting thereon. It is optional which mechanism is to be employed. It is preferred to employ a mechanism in which the pin is operated by the hydraulic apparatus so that the opening operation and the closing operation are ensured and that when the mold has a plurality of the nozzles, the opening and the closing of each nozzle can be controlled separately.

In the press molding process, the molten resin is supplied at a low pressure to a cavity in the mold which is not completely closed and then or while pressurized so that edge portions of the cavity are filled with the resin and then the shaping is carried out. Therefore, when the mold has a plurality of the nozzles, gate balance is of importance and thus nozzle arrangement and an amount of the molten resin supplied through each nozzle should be adjusted properly. In addition, when a resin temperature, a mold temperature and its distribution are not proper, a shape of the molded article is adversely affected. In order to deal with this problem properly, the opening and the closing of the molten resin passage should be surely carried out in an extremely short period and opening and closing periods of each nozzle should be separately controlled.

The present mold may comprise a plurality of thin tubes therein through which a heating medium is circulated to keep the mold at a desired temperature. Also the mold may comprise a heater (5) in a periphery of the molten resin passage so as to keep a temperature of the molten resin constant. In addition, a cavity may be provided around a periphery of the heater in order that heat from the heater does not affect the mold.

Using the mold of the present invention, the thermoplastic resin in the molten condition is supplied through the resin passage into the space between the upper half and the lower half which is not closed, the nozzle is closed, and the clamping of the mold is carried out so that the molded article having a good appearance is produced.

When the thermoplastic resin is molded according to the present press molding process, timely resin supply to the cavity between the upper half and the lower half at the time when a clearance of the cavity becomes proper is also important as disclosed in, for example, Japanese Patent Kokai Publication No. 22917/1986 so as to effectively produce the molded article having the good appearance. For the purpose of such timely supply, it is preferable that the molten resin is supplied during the clearance between the upper half and the lower half is (C+0.1) to 50 mm wherein C is a clearance on final clamping, and during the supply, the clamping is carried out at a rate of not more than 30 mm/sec. or the clamping is temporarily stopped, and then the clamping is re-started at the same time of or just before the completion of the supply of the molten resin.

In the case in which a skin material is beforehand supplied between the upper half and the lower half and lamination molded, it is preferable that the molten resin is supplied during the clearance of the cavity is (C+5) to (C+100) mm in order that the skin material is not damaged by the pressure and the heat.

The thermoplastic material which is used in the present press molding process is any material which is usually used in the injection molding or the extrusion molding. For example, a polypropylene, a polyethylene, a polystyrene, an acrylonitrile/butadiene copolymer and a nylon can be used.

When the skin material is used in the present process, it includes a polyvinyl chloride sheet, a thermoplastic elastomer sheet or a leather like sheet thereof of which surface is embossed or a woven fabric, a nonwoven fabric or a fabric of which back side is laminated with an expanded polyethylene sheet, an expanded polypropylene sheet or an expanded polyurethane sheet and so on.

When the thermoplastic resin is press molded according to the present process, molding conditions are not specifically limited and the conventional molding conditions are applied. For example, in the case in which a polypropylene is used as the thermoplastic resin, when the skin material is not laminated, the preferred conditions for the production of molded article having a good appearance include a resin temperature of 200°-280° C. and a mold temperature of 50°-100° C. and when the skin material is laminated, the preferred conditions include the resin temperature of 170°-220° C. and the mold temperature of 20°-50° C.

It is, of course, that those preferred temperatures depend on properties of the used resin and the used skin material, and thus, the conditions are not particularly limited to those temperatures.

As described above, since the mold for the press molding according to the present invention has the nozzle of which tip portion is located the proper distance below the mold surface, the cavity side surface of the mold is hardly affected by the heat from the tip portion of the nozzle. Therefore, when the thermoplastic resin is press molded using the present mold, the molded article having the good appearance can be produced even when the molding cycle is short.

EXAMPLES

In order to explain the present invention more concretely, Examples will be hereinafter described. However, the present invention is not necessarily limited by those Examples.

EXAMPLE 1

In a press molding apparatus comprising an upper half and a lower half, the lower half (8) as shown in FIG. 2 was used in which the molten resin passage was provided and the tip portions of the two nozzles were separated from the cavity side surface of the mold by a distance of 20 mm.

A temperature of the upper half was set at 90° C. and a temperature of the lower half was set at 80° C., respectively. A polypropylene (available from Sumitomo Chemical Co., Ltd. under a trade name of Sumitomo-Noblen ® AX568, having a melt flow index of 65 g/10 min.) at a temperature of 260° C. was used as the thermoplastic resin. The resin was supplied into the lower half and press molded in a following procedure to produce molded articles.

The molten resin (6) was supplied into the cavity through the molten resin passage by lowering the pin (4) by means of a hydraulic cylinder so that the nozzle (2) was opened, and the pin (4) was raised so that the opening of the nozzle (5) was closed and the resin passage was closed after a desired amount of the resin was supplied whereby the supply of the resin was finished.

Firstly, lowering of the upper half (7) was started. The lowering of the upper half (7) was temporarily stopped when the cavity clearance became 3 mm, and then the supply of the molten resin (6) was started. Just before the supply of a desired amount of the molten resin (6) was completed, the lowering of the upper half (7) was re-started so that the molten resin (6) was press-shaped, then the resin was cooled for 40 seconds while the pressure was applied and then the upper half was raised so that the molded article was taken out. A thickness of the molded article was 1.8 mm and the molding cycle was 55 seconds. Even when such a molding procedure was repeated 500 times in series, the molded articles were produced which had a good appearance without bulge and defective gloss.

EXAMPLE 2

Using a mold in which the tip portion of the nozzle (2) was 65 mm below the cavity side surface of the mold, a following molding procedure was carried out.

A skin material in which a back side of an expanded polypropylene sheet (expansion ratio:15) having an embossed surface and a thickness of 3 mm was laminated with a polyvinyl chloride sheet having a thickness of 0.5 mm by means of an adhesive was beforehand placed on the lower half with a side of the polyvinyl chloride sheet being upside.

Then, the upper half is lowered until the cavity clearance between the upper half (7) and the lower half (8) became 50 mm, the lowering rate of the upper half was set at 5 mm/sec. and the molten resin (6) was supplied through two nozzles (2). The molten resin was supplied between the skin material and the lower half while it pressed the skin material against the upper half surface. When the cavity clearance became 20 mm, the* supply of the resin was finished and, at the same time, the pin (4) was raised so that the opening of each nozzle (2) was closed and the resin passage was stopped. When the upper half (6) was lowered, the molten resin was pressured and the edge portions of the cavity were filled with the fluid resin while the resin pressed the skin material thereon against the upper half. The application of the pressure with cooling was maintained for 40 seconds and then the upper half was raised so that the intended multi-layer molded article was taken out. The cycle of this molding procedure was 65 seconds. Even when such a molding procedure was repeated 100 times in series, the molded multi-layer articles were produced each of which had a good appearance without bulge nor defective gloss.

Comparative Example 1

Example 1 was repeated except that a mold in which the tip portion of the nozzle (2) was 5 mm below the cavity side surface of the mold was used. The articles molded in up to the fifteenth cycle had a good appearance. However, the article molded in the twentieth or more cycle had depressions on portions which were adjacent to the nozzles, and the article molded in the thirtieth or more cycle had remarkable deformations.

EFFECT OF THE INVENTION

Since the tip portion of the nozzle is separated from the cavity side surface of the mold by the proper distance in the mold for the press molding according to the present invention, the cavity side surface of the mold is hardly affected by the heat from the nozzle. Thus, when the press molding of the thermoplastic resin is carried out using the mold, the molded article having the good appearance can be produced even when the molding cycle is short.

What is claimed is:

1. A process for press molding a thermoplastic resin comprising the steps of:
    providing opposing upper and lower mold halves;
    providing a molten resin supply passage in at least one of the upper and lower mold halves;
    providing at least one nozzle member formed in said molten resin supply passage;
    spacing a tip of said at least one nozzle apart from an inner surface of said at least one of the upper and lower mold halves by a distance of from 10–100 mm;
    bidirectionally actuating a pin in said at least one nozzle member for opening and closing the tip of said nozzle within said molten resin supply passage;
    supplying the thermoplastic resin from the molten resin passage through said at least one nozzle to a cavity between opened upper and lower mold halves;
    terminating the supply of thermoplastic resin by closing the tip of the nozzle; and
    clamping together the opposing mold halves after closing the tip of the nozzle.

2. A mold for press molding a thermoplastic resin comprising:
    opposing upper and lower mold halves;
    a molten resin supply passage formed in at least one of the upper and lower mold halves; and
    at least one nozzle member formed in said molten resin supply passage, wherein a tip of said at least one nozzle is spaced apart from an inner surface of said at least one of the upper and lower mold halves by a distance of from 10–100 mm,
    said at least one nozzle member including a bidirectionally actuated pin for opening and closing the tip of said nozzle within said molten resin supply passage.

3. The mold according to claim 2, wherein said molten resin supply passage is formed in the lower mold half.

4. The mold according to claim 2, wherein a pair of nozzle members are provided in said molten resin supply passage.

5. A mold for press molding a thermoplastic resin comprising:
opposing upper and lower mold halves;
a molten resin supply passage formed within at least one of the upper and lower mold halves; and
at least one nozzle member formed in said molten resin supply passage, wherein a tip of said at least one nozzle is spaced apart from an inner surface of said at least one of the upper and lower mold halves.

6. The mold according to claim 5, wherein the tip of said at least one nozzle is spaced apart from an inner surface of said at least one of the upper and lower mold halves by a distance of from 10–100 mm.

7. The mold according to claim 5, wherein said at least one nozzle member includes a bidirectionally actuated pin for opening and closing the tip of said nozzle within said molten resin supply passage.

8. The mold according to claim 6, wherein said at least one nozzle member includes a bidirectionally actuated pin for opening and closing the tip of said nozzle within said molten resin supply passage.

9. The mold according to claim 7, wherein said molten resin supply passage is formed in the lower mold half.

10. The mold according to claim 7, wherein a pair of nozzle members are provided in said molten resin supply passage.

* * * * *

UNITED STATES PATENT AND TRADEMARK OFFICE
CERTIFICATE OF CORRECTION

PATENT NO. : 5,336,463
DATED : August 9, 1994
INVENTOR(S) : Takahisa HARA, Masahito MATSUMOTO, Nobuhiro USUI and Shigeyoshi MATUBARA It is certified that error appears in the above-indentified patent and that said Letters Patent is hereby corrected as shown below:

On the Title Page, under the Heading, [22] Filed: change

"Dec. 24, 1992" to

-- PCT Filed: April 23, 1992 --

Insert Headings, -- [86] PCT No.: PCT/JP92/00525
§371 Date: Dec. 24, 1992
§102(e) Date: Dec. 24, 1992
[87] PCT Pub. No.: WO92/19433
PCT Pub. Date: Nov. 12, 1992 --

Signed and Sealed this

Twenty-first Day of March, 1995

Attest:

BRUCE LEHMAN

*Attesting Officer*   *Commissioner of Patents and Trademarks*